Inventors
C. I. CONNER
A. T. KILLINER
By Cameron, Kerkam & Sutton
Attorneys

Inventors
C. I. CONNER
A. T. KILLINER
By
Cameron, Kerkam & Sutton
Attorneys

United States Patent Office 3,449,542
Patented June 10, 1969

3,449,542
PHOTOELECTRIC CONTROL MEANS FOR DE-
FLECTING BEAMED ENERGY AS APPLIED
TO THE SURFACE OF A WORKPIECE
Charles Irvine Conner, Penicuik, and Arthur Thomas
Killiner, Crescent, Musselburgh, Scotland, assignors to
Ferranti, Limited, Hollinwood, Lancashire, England, a
company of Great Britain and Northern Ireland
Filed Oct. 11, 1966, Ser. No. 585,857
Claims priority, application Great Britain, Oct. 14, 1965,
43,545/65
Int. Cl. B23k 15/00, 9/10
U.S. Cl. 219—121                      5 Claims

ABSTRACT OF THE DISCLOSURE

A servo system to control the movement of an electron beam in machining engagement with a workpiece, the system responding in dependence on the displacement with respect to a reference point on a photocell surface of a projected image of the light spot set up at the point where the beam engages the workpiece.

---

This invention relates to systems for controlling beamed energy as applied to the surface of a workpiece.

The beam may be an electron beam; in which case the system may be applied to electron-beam welding apparatus, or to apparatus in which a workpiece is machined by the beam in some way—for example by removal of material by vaporisation. Or the beam may be an ion beam or a laser beam.

An object of the invention is to provide such a system in which the beam is deflected so as to direct its point of application to a desired spot on a workpiece surface, in particular in accordance with the requirements of a demand signal.

Another object is to provide such a system in which the control is applied to the focus and/or acceleration of the beam so as to bring to a maximum the energy dissipated at the workpiece surface.

Figure 1:
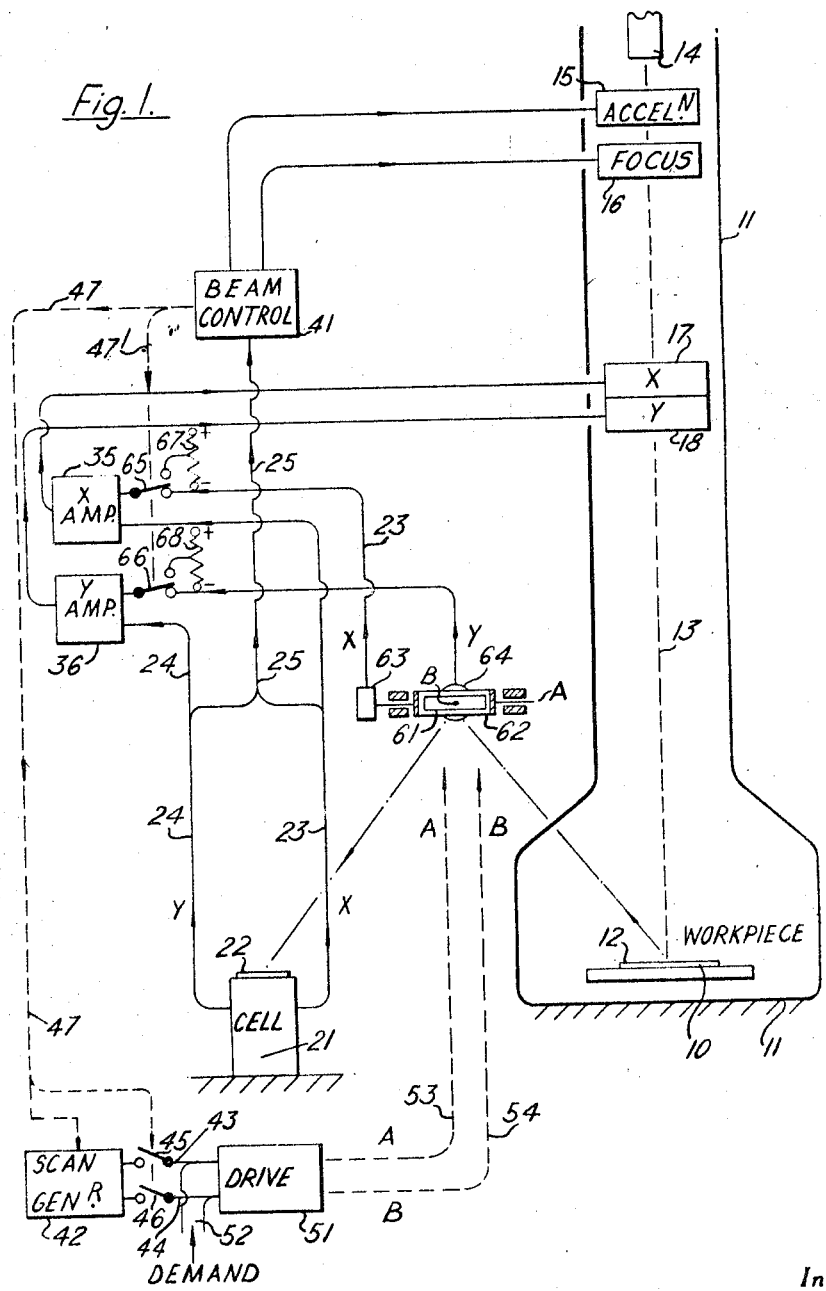
Figure 2:
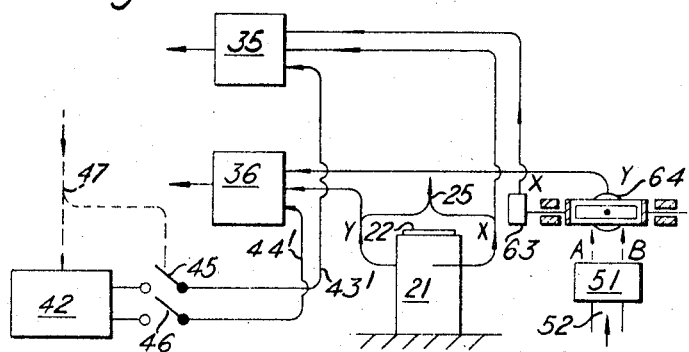
Figure 3:
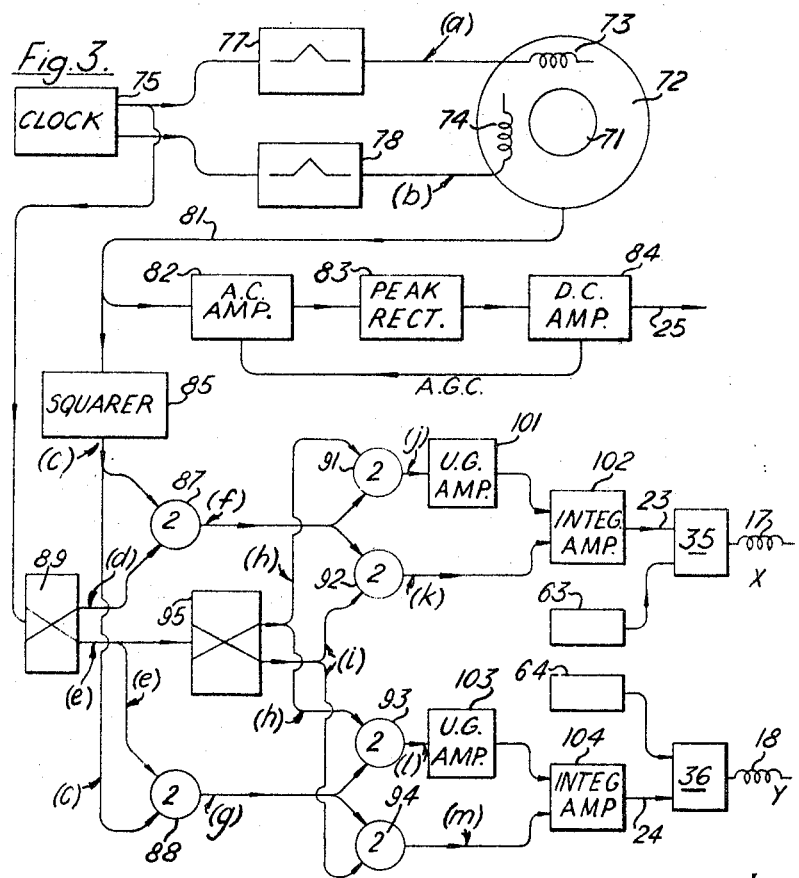
Figure 4:
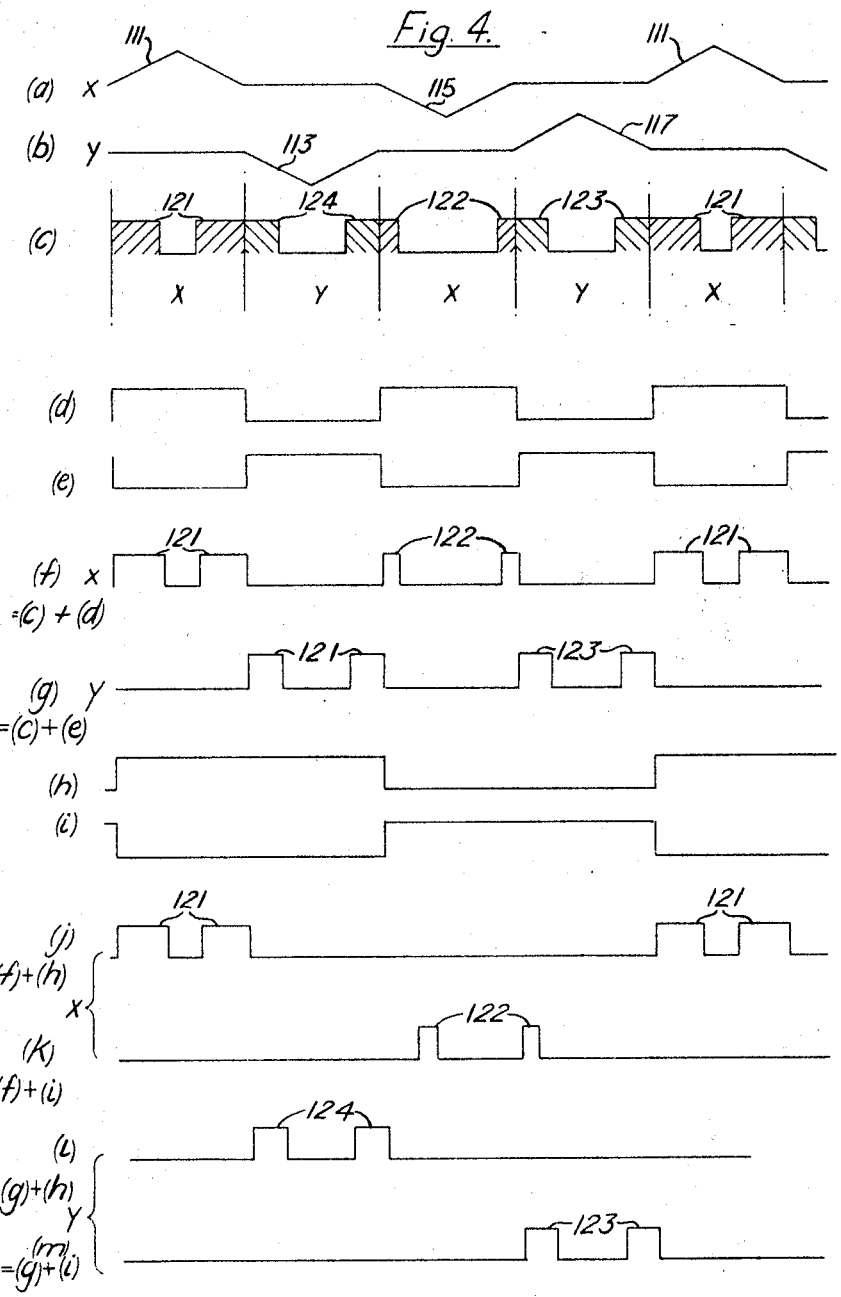
Figure 5:
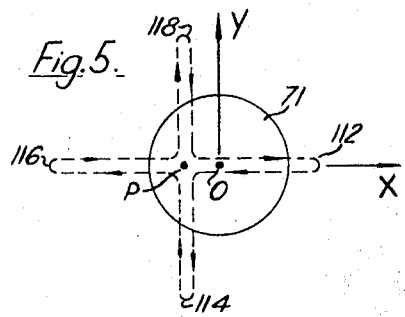
Figure 6:
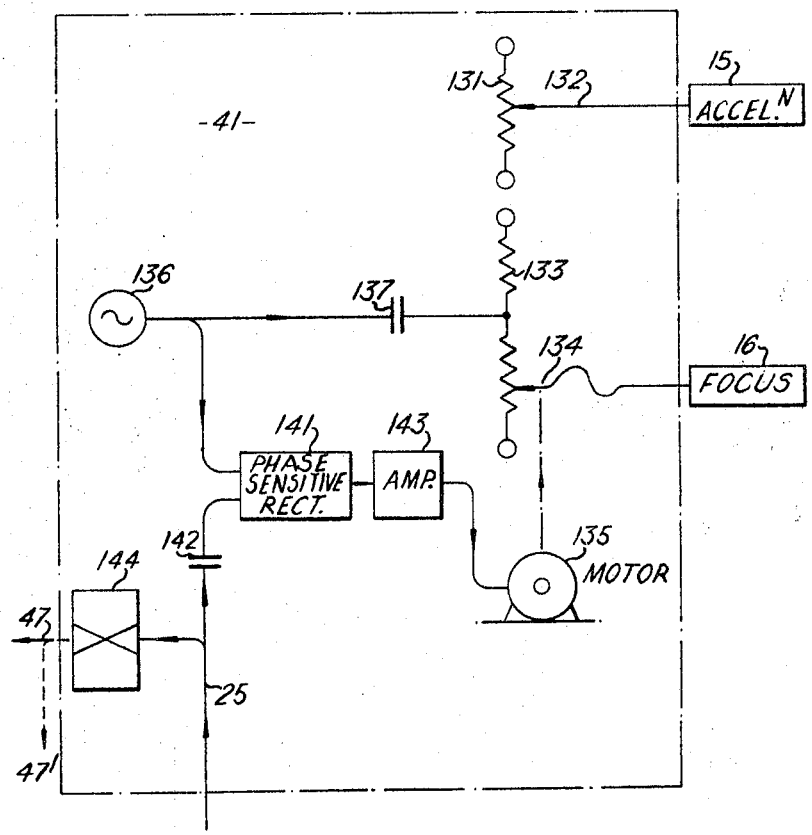

In the accompanying drawings,

FIGURE 1 shows a simplified schematic diagram of one embodiment of the invention, FIGURE 2 shows a part of the arrangement of FIGURE 1 modified in accordance with a further embodiment, FIGURES 3 and 6 show suitable details for parts shown generally in FIGURE 1, and FIGURES 4 and 5 are to illustrate the operation of the embodiment of FIGURE 3.

An embodiment of the invention will now be described by way of example as applied to electron-beam welding equipment. In this embodiment—see FIG. 1—the workpiece 10 is contained in an evacuated enclosure 11. The workpiece surface 12 which is to be engaged by the beam is assumed for convenience to be planar and is depicted as normal to the plane of the paper. The electron beam 13 is directed to surface 12 from a gun 14 by way of accelerating electrodes 15, focusing electrode 16, and means for deflecting the beam in the form of deflectors 17 and 18 for controlling the beam in the usual X and Y orthogonal directions. All these components are within the enclosure 11.

Fixed with respect to enclosure 11 is a photo-electric transducer 21 having a light sensitive surface 22 which will be assumed to be parallel to surface 12 of the workpiece. The transducer is such that when its sensitive surface 22 is engaged by a spot of light, outputs are supplied over X and Y leads 23 and 24 in dependence the coordinate position of the spot with respect to a reference point on surface 22 which will be assumed to be its centre. Suitable apparatus for this transducer is described below with reference to FIGS. 3 to 5. For convenience it will in the meantime be referred to as a photocell or cell, though in practice, as described below, it may include not only a photocell but considerable equipment in addition.

The output over X lead 23 is applied by way of a high-gain amplifier 35 to the X deflectors 17; similarly the output over Y lead 24 is applied by way of another high-gain amplifier 36 to the Y deflectors 18.

Cell 21 also supplies over a lead 25 a third output in the form of a potential or current which varies directly with the intensity of any light spot which engages surface 22. This output is applied to control a stage 41, which in turn supplies signals to the focus and acceleration electrodes 15 and 16. Suitable apparatus for stage 41 is described below with reference to FIG. 6.

By means of an optical projection system, part of which is represented in the drawing by a mirror 61 (the necessary lenses being omitted for clarity), an image of surface 12 is projected towards photocell 21 so that the image of the light spot set up where the surface is engaged by the beam is brought to a conjugate position in the plane of sensitive surface 22 of the photocell.

Mirror 61 constitutes movable control means for controlling in orthogonal directions the position of the beam spot on the workpiece. For this purpose the mirror, which is outside the enclosure 11, is mounted on a gimbal system 62 to allow its angular movements about orthogonal axes A and B to bring the spot image onto surface 22. Angular pickoffs 63 and 64 are provided and arranged to be responsive to the movements about those respective axes with reference to fixed datum directions (not shown). These pickoffs will sometimes be referred to hereinafter as the X and the Y pickoffs respectively, since the angular movements of the mirror 61 about the A and B axes causes movements of the spot image in the X and Y directions of the sensitive surface 22. It is desirable for the mirror to be located sufficiently far from the workpiece for the required movements of the spot in the X and Y directions in the plane of surface 22 to be proportional to the corresponding angular movements of the mirror about A and B axes.

The outputs from X and Y pickoffs are applied as further inputs to amplifiers 35 and 36 and hence to beam deflectors 17 and 18. The connection from pickoff 63 to amplifier 35 is by way of a changeover switch 65 operable by stage 41 over a channel 47'. In its normal or unoperated condition the switch connects the amplifier input to the pickoff. When operated, the switch transfers the amplifier input to a source of potential in the form of an energised potentiometer 67. The connection from the amplifier 36 to pickoff 64 is similarly by way of a switch 66 controllable over channel 47' so as to connect the amplifier input either to pickoff 64 or to an energized potentiometer 68.

The angular positions of mirror 61 about the A and B axes are controllable by a driving stage 51 in response to demand signals received over a channel 52, the drive being applied to the mirror over A and B leads 53 and 54.

To bring the spot image onto surface 22 in the circumstances to be explained below, a scan generator 42 is provided. Its output is applied by way of Make switches 45 and 46 over leads 43 and 44 as an input to the driving stage 51 which is alternative to the input provided over demand channel 52. The generator and switches 45 and 46 are controlled by stage 41 over a channel 47.

Under normal conditions of operation, with the spot image engaging surface 22, switches 65 and 66 connect amplifiers 35 and 36 to the X and Y pickoffs, switches 45 and 46 are open, and generator 42 is inoperative.

In operation, the workpiece is placed in enclosure 11, which is made sufficiently demountable to allow this, and after the enclosure has been sealed and evacuated the beam is switched on.

The general arrangement is such that, ideally, whatever angular position the mirror 61 happens to be in when the beam is switched on, the output from the X and Y pickoffs, acting by way of amplifiers 35 and 36 and the deflectors 17 and 18, so direct the beam that the image of the spot where the beam engages workpiece surface 12 is projected so as to fall within sensitive surface 22 of the cell. In response, the cell develops X and Y error signals in dependence on the displacement of the spot image from the reference centre of the surface, and, by applying those signals over leads 23 and 24 and the amplifiers to the deflection system, deflects the beam and hence the spot position in directions which tend to null the signals, thereby bringing the spot image into approximate registration with the centre of surface 22. A closed feedback servo loop is thus formed by the beam spot on the workpiece, the spot image, cell 21, the connections from the cell to the deflection system, and the beam itself. As usual with servo systems, the error signals are not completely nulled, but retain just sufficient values to maintain the required deflection of the beam; but provided that amplifiers 35 and 36 have high enough gains, the spot image will be centred on surface 22 to a very close approximation.

In this servo system, the mirror represents the input member, and the point of application of the beam on the workpiece represents the output member. Thus by angularly moving the mirror about its A and B axes, the position of the beam spot on the workpiece may be varied as desired. The follow-up is rapid enough to keep the spot image on the sensitive surface 22. By supplying stage 51 over channel 52 with a demand signal in which a program of required spot position is encoded, the mirror is driven by the driving links 53 and 54 and so causes the beam spot to engage the workpiece in accordance with the program.

In practice, owing mainly to unavoidable non-linearities of the beam-deflection system, a misalignment condition may arise such that when the beam is switched on, the signals from the X and Y pickoffs 63 and 64 do not bring the spot image onto surface 22, with the result that the servo loop cannot function. In this event the output from the cell 21 is zero, or at least a predictable minimum, and stage 41 is arranged to respond to such a signal by activating generator 42 (by way of channel 47) and closing switches 45 and 46 to apply its scan signals over leads 43 and 44 as an alternative input to stage 51, thereby angularly swinging the mirror to cause the spot image to scan the plane containing sensitive surface 22 until the spot image engages that surface.

As such misalignment of the beam will usually be slight, for pickoffs 63 and 64 will usually have located the spot image fairly near surface 22, the duration of this scan is likely to be short. Once the spot image has been brought onto surface 22, the servo operates quickly to centre it. The resulting substantial output from the cell over lead 25 causes stage 41 to open switches 45 and 46 and render generator 42 inactive. Thereafter the servo operates to maintain the spot image approximately centred throughout the movements of the mirror in accordance with the program prescribed by the demand signal.

As the actual beam spot must be immobilised on the workpiece during this scan, it is necessary to disconnect from the deflectors 17 and 18 the X and Y pickoffs 63 and 64, since their outputs will be varying with the movement of the mirror. This is effected, at the same time that generator 42 is energised and switches 45 and 46 closed, by the operation by stage 41 of switches 65 and 66 to transfer the amplifier inputs to potentiometers 67 and 68, the taps on which are manually adjustable to retain the beams engaging a convenient point on the workpiece. At the end of the scan, stage 41 restores switches 65 and 66 to reconnect the pickoffs to the amplifier, at the same time as it opens switches 45 and 46 and switches off generator 42.

In an alternative arrangement, see FIG. 2, the generator 42 brings the spot image onto surface 22 by applying its scan signals by way of switches 45 and 46 and leads 43' and 44' as another input to amplifiers 35 and 36, thereby assisting pickoffs 63 and 64 rather than replacing them. In this arrangement, therefore, switches 65 and 66 are not required, as the pickoffs are required to remain connected to the amplifiers. Generator 42 and switches 45 and 46 are controlled by stage 41 over channel 47 as before.

In either of the above-described embodiments, the control means may be an optical device, such as a prism or combination of prisms, rather than a mirror.

Beam-control stage 41 also serves to control such an energy characteristic of the beam as the focus or acceleration of the beam, in dependence on the strength of the signal received from the cell over lead 25, so as to bring to a maximum the energy dissipated at the beam spot on the workpiece. This part of the operation relies on the fact that the brightness of the spot on the workpiece, and hence of its image on surface 22, are directly related to the energy being dissipated, and the strength of the output signal from the cell is directly related to the brightness of the spot image. As will be more fully described with reference to FIG. 6, stage 41 operates to adjust the focus and the acceleration of the beam to bring to a maximum the signal it receives from the cell, and hence the energy dissipated.

A simple arrangement for transducer 21, not shown, includes a square pyramid reflector arranged to split up the spot image four ways to four photocells so that the differential output from two opposite cells indicates the displacement of the beam in one direction whilst the differential output from the other two indicates the displacement in the direction at right angles. The summed output from all four cells forms the total output to be applied to stage 41 over lead 25. A more complicated but preferred arrangement which uses one cell with some extensive associated circuitry for use with the arrangement of FIG. 1 will now be described with reference to FIGS. 3 to 5.

The photocell is assumed to be of the known kind in which the spot image first falls on a photocathode the electrons from which are focussed as an electron image in an image plane within the cell. This plane has a circular aperture through which the electrons can pass to a dynode stage followed by an output anode. Across this aperture the electron image of the spot can be swept in X and Y directions by interior deflector coils. To simplify the description, all that is shown of the cell in FIG. 3 is the aperture 71 inside the cell 72 with the interior X and Y deflector coils 73 and 74. Aperture 71 is the equivalent of the sensitive surface, above mentioned, of the cell, and the coils may be thought of as capable of sweeping the spot image across it in a manner to be described.

From the counterphase outputs of a clock pulse generator in the form of a multivibrator 75, X and Y triangular deflection signals are derived in sawtooth generator stages 77 and 78 for application to coils 73 and 74 respectively.

The cell output is applied over a lead 81 to an alternating current amplifier 82, a peak rectifier 83, and a direct-current amplifier 84, to provide over output lead 25 (see FIG. 1) the signal which varies in intensity with the intensity of the spot image. An auto gain control is fed back from stage 84 to stage 82.

The cell output, after amplification, limiting, and squaring in a stage 85, is also applied as an input to each of And gates 87 and 88 the other inputs to which are provided by the respective counterphase outputs from a bistable stage 89 driven by clock 75.

The output from gate 87 is applied as an input to each of two further And gates 91 and 92, whilst the output from gate 88 is applied as an input to each of And gates 93 and 94. The remaining inputs to gates 91 and 93 are supplied by one of the outputs from a bistable stage 95 driven by one of the outputs from stage 89; the other output from stage 95 is applied to gates 92 and 94.

The output from gate 91, after being reversed in polarity by a unity-gain amplifier 101, is applied by way of an integrating amplifier 102 and linear amplifier 35 (FIG. 1) to the X deflector coils 17 of the main beam. The output from gate 92 is applied direct as a second input to amplifier 102. A second input to amplifier 35 is derived from the X pickoff 63 (FIG. 1).

Similar arrangements are made for the Y deflector coils. Gate 93 is connected by way of a reversing amplifier 103 to an integrating amplifier 104, the other input to which is derived from gate 94 without reversal. The output from amplifier 104 is applied with the signal from the Y pickoff 64 to the Y coils 18 by way of linear amplifier 36.

The operation of this equipment will be described with reference to the signal waveforms of FIG. 4. All these waveforms are of the triangular or rectangular kind including portions which would be conveniently designated positive-going or negative-going. For ease of description, however, these portions will be referred to simply as positive or negative, as if the zero signal line transected each waveform. It will however be appreciated that the zero level may in fact be wholly above or wholly below the wave, with the result that both portions are negative or both positive, as the case may be.

The waveforms of the X and Y triangular deflection signals applied by stages 77 and 78 to deflect the spot image are shown at $(a)$ and $(b)$. Their effect on the spot's position with respect to the X and Y coordinates having as origin O the centre of the aperture 71 of the photocell is shown in FIG. 5. It is assumed that the mean position P of the spot, as determined by the outputs from pickoffs 63 and 64 (FIG. 1) lies on the X axis but somewhat displaced in the negative direction from the Y axis. The to-and-fro movements of the spot as the result of the application of the triangular swings of waves $(a)$ and $(b)$ to coils 73 and 74 of the cell (see FIG. 3) are shown in broken lines with the outputs and return paths slightly displaced from one another for clarity.

Thus the positive X swing 111 of sign $(a)$ carries the spot image from the point P in the positive direction along the X axis to the point 112 outside aperture 71 and then back to the point P. The next excursion of the spot is negatively in the Y direction in response to the Y swing 113 of signal $(b)$, carrying the spot to point 114 outside aperture 71 and then back. Similarly the negative X swing 115 carries the spot to point 116 and back, and is followed by the positive Y swing 117 to point 118 and back. The cycle is then repeated.

Wave $(c)$ shows the effect of these excursions on the output from the cell after limiting and squaring by stage 85. So long as the spot image is within aperture 71 the cell delivers a steady output signal, which falls to zero (or some known constant minimum) as soon as the spot passes outside the aperture on its way to one of points 112, 114, 116, or 118. In drawing the waveform it has been assumed for convenience that the spot image is of negligible area, giving an abrupt transition between the two states.

Thus as shown by wave $(c)$ the result of each excursion is a pair of pulses of equal width representing the outgoing and return movements of the spot across aperture 71 separated by a space representing the intermediate period whilst the pulse is outside and in consequence the cell output is minimal. Because of the displacement of the point P from the centre O of the aperture, the spot remains longer within aperture 71 during the positive X excursions than during the excursions in the opposite direction. Hence each X pulse of pulse pairs 121 of signal $(c)$ due to positive swings 111 of signal $(a)$ is considerably wider than each X pulse 122 due to the negative swings 115.

On the other hand as the point P is on the X axis, the Y pulses 123 due to positive Y swings 116 of signal $(b)$ have the same width as pulses 124 due to the opposite swings 113.

All that the rest of the equipment of FIG. 4 does is to derive for each of the X and Y directions an error signal which is in sense and quantitative dependence on the difference between the widths of pulses 121 and 122 for the X axis, and pulses 123 and 124 for the Y axis, and apply those error signals to bring the spot image to the centre O of aperture 71. In the present instance the fact that the Y pulses 123 and 124 are of equal width shows that the spot is already correctly positioned as regards the Y axis; consequently an error signal is developed for only the X axis.

In more detail, stage 89 produces counterphase squarewave outputs $(d)$ and $(e)$ each positive half-cycle of which coincides with the X swings of wave $(a)$ and the Y swings of wave $(b)$ respectively. By combining signals $(c)$ and $(d)$ at gate 87, which responds to positive inputs, all the X pulses are divided out of signal $(c)$, as shown at $(f)$.

Similarly by combining signals $(c)$ and $(e)$ at gate 88 the Y pulses are divided out—see waveform $(g)$.

It is now necessary to split up the pulses still further, dividing those resulting from the positive swings of the deflection signals from those resulting from the negative swings. For this purpose stage 95 develops from the signal $(e)$ output of stage 89 counterphase rectangular signals of half the frequency—see waveforms $(h)$ and $(i)$. It will be seen that the positive half-cycles of signal $(h)$ coincide with only the X pulses 121 which are due to the positive swings of the deflection signal, and only Y pulses 124 due to negative swings. The remaining X and Y pulses 122 and 123 coincide with the positive swings of signal $(i)$.

Thus by combining signals $(f)$ and $(h)$ at gate 91 the X pulses 121 are derived, see wave $(j)$, the other X pulses 122 being derived from signals $(f)$ and $(i)$ at gate 92—wave $(k)$.

The Y signals are similarly separated by combining signal $(g)$ with signals $(h)$ and $(i)$ at gates 93 and 94—see waveforms $(l)$ and $(m)$.

Having thus separated the two trains of X pulses 121 and 122, it is now necessary to provide an output dependent on their width difference. This is effected by the integrating amplifier 102 after the polarity of pulses 121 has been reversed by stage 101 to result in subtraction. The output from amplifier 102 is thus a D.C. error signal of sense and value determined by the pulse width difference, and so representing the extent and sense of the displacement of the mean position P of the spot image from the centre O of aperture 71 in the direction of the X axis. In amplifier 35 this error signal is combined with the signal from the X pickoff 31 to energise coils 17.

Similarly with the Y coordinate: stages 103 and 104 derive the Y error signal—in this instance zero—is dependent on the width difference between pulses 123 and 124, the signal from pickoff 32 being added at amplifier 36 before application to the Y coils 18.

Beam-control stage 41 may take the form shown in FIG. 7. In this arrangement the accelerating voltage applied to electrode 15 is kept constant; it is accordingly derived from an energised D.C. potentiometer 131 by way of a slider 132 which is manually adjustable to provide the degree of acceleration required.

The focusing voltage for electrode 16 is derived from another energised D.C. potentiometer 133 by way of a slider 134 adjustable by a motor 135.

An oscillator 136 imposes cyclic variations on the focusing potential by way of a capacitor 137 and a central tap on potentiometer 133. The output from the oscillator is also applied to a phase-sensitive rectifier 141 to provide a signal of reference phase to compare with the A.C. component (due to the resulting cyclic variations of intensity of the spot image) of the A.C. signal from the photocell. The signal is received over lead 25, from which the A.C. component is extracted and applied to stage 141 by way of a capacitor 142.

The output from stage 141 is applied by way of an amplifier 143 to drive the motor 135.

Lead 25 is also connected to apply a triggering signal to a bistable stage 144 an output of which is applied to channels 47 and 47'.

The operation relies on the fact that the brightness of the spot image is related to the focus potential by a curve which passes over a maximum (where the curve is nearly flat) at a point where the focus potential has an optimum value. Assuming again that the photocell is of the kind having an output which varies directly with the light intensity, a similar curve relates the value of the photocell signal to the focus potential.

Where the focus potential has the optimum value, the fluctuations imposed on it by oscillator 136 lie within the nearly flat part of the curve. As a result, no appreciable A.C. component is present in the signal from the photocell.

Where on the other hand the focus potential is appreciably different from optimum, the oscillations take place on a sloping part of the response curve. Accordingly an A.C. component appears in the signal from the cell and is in phase or in counterphase with the reference signal from the oscillator 136 according as the mean focus potential is less or greater than the optimum value. In response to this A.C. signal, stage 141 derives an output signal which (after amplification by stage 143) is applied to the motor 135 to cause it to adjust slider 134 in the sense to shift the focus potential towards optimum.

Stage 144 is triggered whenever the signal on lead 25 falls to a predetermined minimum level. When so triggered, the stage applied over channel 47 (and channel 47', where provided) the switching signals required to bring the scan generator into operation.

Driving links 53 and 54 of FIG. 1 may take the form of a closed-loop servo system in which the actual drive in each of the X and Y directions is applied by a reversible servo motor energised by an error signal; this signal is derived from a comparison of the demand signals from channel 52 with measurement signals which represent the actual angular positions of the mirror.

What we claim is:
1. A system for controlling beamed energy as applied to the surface of a workpiece including means for deflecting the beam in orthogonal directions, a photoelectric transducer for providing error signals in dependence on the displacement of a light spot in orthogonal directions with respect to a reference point on the sensitive surface of the transducer, an optical system for projecting onto that surface an image of the light spot where the beam engages the surface of the workpiece, a closed feedback loop including the transducer and the deflection means for deflecting the beam in dependence on said error signals so as to tend to null them and so maintain the spot image in approximate engagement with said reference point, movable control means for controlling in orthogonal directions the position of the beam spot on the workpiece, pick-offs for providing response signals in dependence on the movement of the control means, said control means including an optical device forming part of said optical system and mounted for angular movement about orthogonal axes, said pickoffs being responsive to said angular movements, connections from the pick-offs to the deflection means to cause the beam to be deflected in dependence on the pick-off responses so as to tend to maintain the spot image within the sensitive surface of the transducer, and a driving stage for adjusting the control means, and hence the position of the beam spot on the workpiece, in dependence on a demand signal.

2. A system as claimed in claim 1 which further includes a scan generator with arrangements for actuating it when the output from the transducer has fallen as the result of a departure of the spot image from the sensitive surface of the transducer, and scanning means whereby the generator when so actuated effects a scanning operation to restore the spot image to that surface.

3. A system as claimed in claim 2 wherein the scanning means includes arrangements whereby the generator when so actuated superimposes beam deflection signals on those of the pickoffs to assist the pickoffs with the deflection of the beam.

4. A system as claimed in claim 2 wherein the scanning means includes arrangements whereby the generator when so actuated adjusts said optical device, switching means being provided for interrupting the connections from the pickoffs to the deflection means throughout said scanning operation.

5. In a system for controlling beamed energy as applied to the surface of a workpiece including means for deflecting the beam in orthogonal directions, a photoelectric transducer for providing error signals in dependence on the displacement of a light spot in orthogonal directions with respect to a reference point on the sensitive surface of the transducer, an optical system for projecting onto that surface an image of the light spot where the beam engages the surface of the workpiece, a closed feedback loop including the transducer and the deflection means for deflecting the beam in dependence on said error signals so as to tend to null them and so maintain the spot image in approximate engagement with said reference point, movable control means for controlling in orthogonal directions the position of the beam spot on the workpiece, pick-offs for providing response signals in dependence on the movement of the control means, connections from the pick-offs to the deflection means to cause the beam to be deflected in dependence on the pick-off responses so as to tend to maintain the spot image within the sensitive surface of the transducer, and a driving stage for adjusting the control means, and hence the position of the beam spot on the workpiece, in dependence on a demand signal, the improvement which resides in said control means comprising an optical device forming part of said optical system and mounted for angular movement about orthogonal axes, said pickoffs being responsive to said angular movements.

References Cited

UNITED STATES PATENTS 3,267,250   8/1966   Ullery _____ 250—203 X
3,308,264   3/1967   Ullery _____ 219—121

FOREIGN PATENTS

38/5955   5/1963   Japan.

RICHARD A FARLEY, *Primary Examiner.*

JOSEPH G. BAXTER, *Assistant Examiner.*

U.S. Cl. X.R.

250—203, 217